May 28, 1940.   W. H. HOWE   2,202,205
ELECTRIC VALVE CONTROL SYSTEM
Filed Nov. 9, 1935   8 Sheets-Sheet 1

Inventor
Wilfred H. Howe
by Wright, Brown, Quinby & May
Attys.

May 28, 1940.  W. H. HOWE  2,202,205
ELECTRIC VALVE CONTROL SYSTEM
Filed Nov. 9, 1935   8 Sheets-Sheet 2

Inventor
Wilfred H. Howe
by Wright Browne Quinby & May
attys.

May 28, 1940. W. H. HOWE 2,202,205
ELECTRIC VALVE CONTROL SYSTEM
Filed Nov. 9, 1935 8 Sheets-Sheet 3

Inventor
Wilfred H. Howe

May 28, 1940.  W. H. HOWE  2,202,205

ELECTRIC VALVE CONTROL SYSTEM

Filed Nov. 9, 1935   8 Sheets-Sheet 4

Inventor
Wilfred H. Howe
by Wright Brown Quinby & May
Attys.

May 28, 1940.  W. H. HOWE  2,202,205
ELECTRIC VALVE CONTROL SYSTEM
Filed Nov. 9, 1935  8 Sheets-Sheet 5

Inventor
Wilfred H. Howe
by Wright Brown Quinby & May
Attys.

May 28, 1940.  W. H. HOWE  2,202,205
ELECTRIC VALVE CONTROL SYSTEM
Filed Nov. 9, 1935   8 Sheets-Sheet 7

Inventor
Wilfred H. Howe

Inventor
Wilfred H. Howe

Patented May 28, 1940

2,202,205

UNITED STATES PATENT OFFICE 2,202,205

ELECTRIC VALVE CONTROL SYSTEM

Wilfred H. Howe, Winchester, Mass., assignor, by mesne assignments, to The Foxboro Company, Foxborough, Mass., a corporation of Massachusetts Application November 9, 1935, Serial No. 49,099

30 Claims. (Cl. 250—27)

In my application for patent Serial No. 682,120, filed July 25, 1933, Reissue Patent No. 20,418, dated June 22, 1937, for Method of controlling rectifiers and circuits therefor, is disclosed a method of controlling the flow of electric power through one or more ionic valves, each valve having a plurality of electrodes between which is impressed a cyclic voltage differential periodically reaching a value to stop current flow once started, and having a potential-responsive control means of the time of starting of the current flow, on which means is impressed a cyclic potential. In that application the control of the passage of electric power is shown as accomplished through variation of a direct current component of the cyclic controlling potential, the type of control being determined by the phase relation between the cyclic potential and the cyclic potential difference across the electrodes which are of the same frequency, and the effects of harmonics in the control frequency which modify the pattern of the controlling cyclic voltage have been disclosed.

The present invention relates to control accomplished by a pattern of potential containing two or more cyclic components. This pattern may contain a variety of components but always contains components of other frequencies than the anode-cathode potential. The control is accomplished by a controlling pattern which always contains a fixed cyclic component and may or may not contain variable cyclic controlling potentials.

The subject matter of this present application is particularly adapted to situations where the power variation required or the relation between its variation and the controlling variable is more exacting than can be met satisfactorily by the arrangements shown in my earlier application. It is also suited to situations where a cyclic rather than a direct current controlling potential is available from the controlling source. Specific examples where the control of the present application are desirable will be later set forth. In every case there is a required performance to be controlled by the ionic valve and in every case the passage of electric power is controlled by a cyclic potential impressed on the valve control circuit of a prescribed continuous pattern in order that the required continuous performance may be obtained.

The pattern chosen for control must take account of all the variables encountered between the controlling potential and the required output characteristic. There are many factors which may require consideration in arriving in the necessary pattern. Among these factors may be mentioned:

(1) The characteristics of the ionic valve;

(2) The magnitude and wave form of the supply circuit. Correction of or compensation for specific wave form may be readily applied in accordance with this invention;

(3) The characteristics of the load. Reactive components of load impedance may cause current flow differing in timing, wave form and average value from the potential which produces it;

(4) The characteristics of the controlling circuit. These are of particular importance where a high impedance circuit is employed, since the actual control voltage impressed on the valve control means may vary considerably in magnitude, phase and wave form from the potential supplied to this circuit for the purpose of control, for example, a pattern potential applied to the control circuit during the time of ignition of a thermionic valve may set up a bias in a resistor which will carry over into the next ignition period.

(5) The characteristics of the controlling variable. The effect of a direct current controlling variable is discussed in my application Serial No. 682,120 hereinbefore mentioned.

The pattern may consist of components all of which are fixed, or it may contain variable as well as fixed cyclic components.

The type of ionic valve in connection with which this invention will be more completely described is the well known gas-filled thermionic valve or tube commonly used as a rectifier and having a hot cathode and a separate control of ignition time. Such valves have the peculiarity that if the grid or controlling voltage reaches a sufficiently positive value at any time during the cycle of anode-cathode potential when current may pass, the valve opens for the passage of current and stays open throughout the remainder of the plate cathode potential cycle during which current can flow, even though the grid circuit potential should have fallen in the meantime to a value too negative to have caused the valve to open and permit current flow had it not already been flowing. For convenience, this invention will be further described with reference to the mercury-filled tubes, it being evident that similar conditions with tubes containing other gases will occur.

The effects of the characteristics of the tube itself on the system are apparent. These take the form of (1) a steady potential drop of about 15 volts across the tube from anode to cathode during the time of current flow; (2) a fixed critical characteristic, that is, a potential from grid to cathode necessary to just prevent ignition for any given potential differential between anode and cathode; (3) a grid potential and effective grid cathode impedance during the time of anode-cathode current flow, and (4) the time of ionization and deionization. For simplicity in the following discussion the 15 volts anode-cathode potential drop will be neglected, assuming that the applied anode-cathode potential is of sufficient magnitude so that this 15 volts may be neglected. It will also be assumed that the tube has a constant zero critical potential, that is, for all positive values of anode-cathode potential the tube will ignite if the grid to cathode potential is positive, and will not ignite if the grid to cathode potential is negative. The effects of grid current and impedance during the time the tube is ignited will also be neglected unless otherwise mentioned, as also will be the time of ionization and deionization of the tube. All of these factors, may, however, be provided for in the control pattern where this is desirable.

For a more complete understanding of this invention, reference may be had to the accompanying drawings in which Figures 1 and 2 are diagrams showing the effect on the relationship between controlling potential and controlled ignition time of a fixed pattern of specific wave forms added to a sinusoidal alternating current potential of varying magnitude 90° leading the plate cathode voltage.

Figure 20:
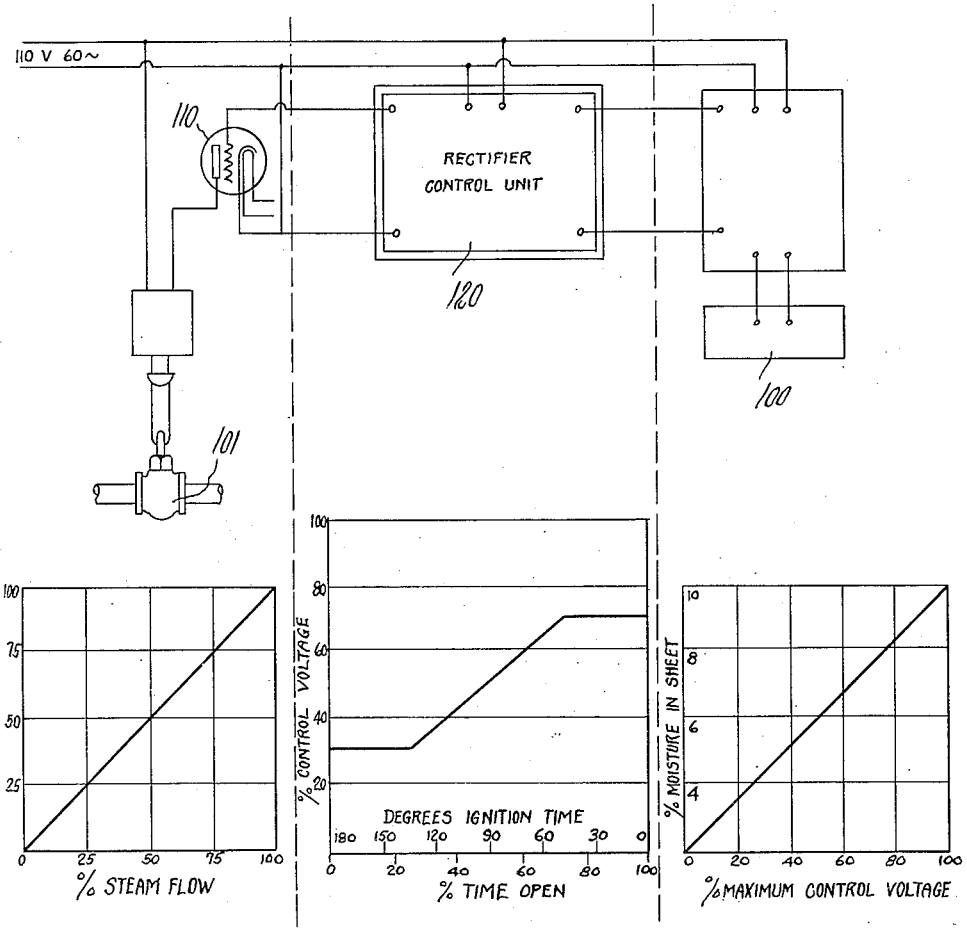
Figure 20 is a diagrammatic view of a system of rectifier control for the steam supply of a drier.
Figure 21:
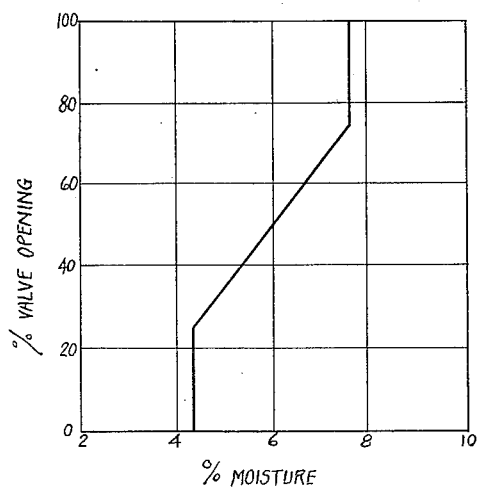
Figure 21 is a diagram showing characteristic relations between the controlling and controlled mechanism.
Figure 22:
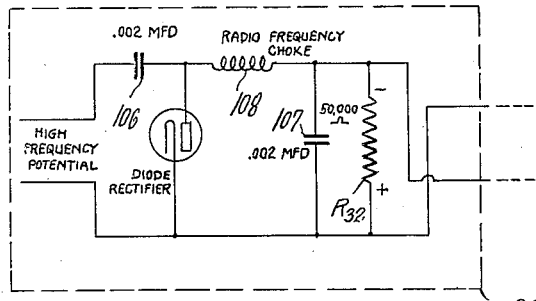
Figure 24:
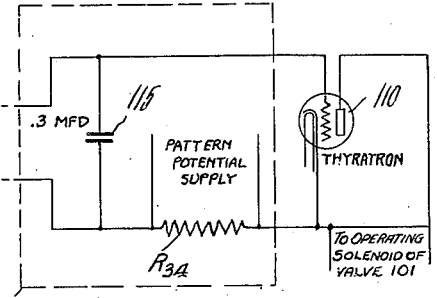

Figures 22 and 24 together are a diagram of the rectifier control unit shown in Figure 20.

Figure 23:
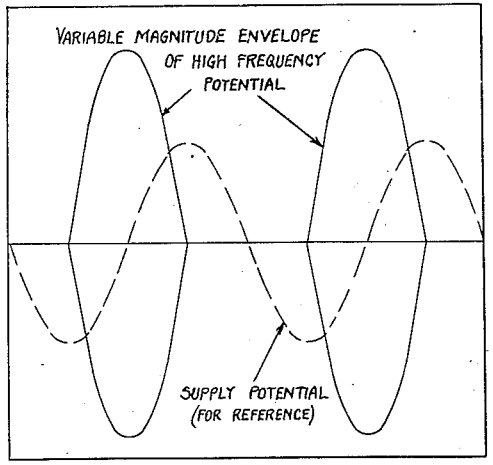

Figure 23 is a diagram of the input to the rectifier control unit from the moisture measuring mechanism shown in Figure 20.

Figure 25:
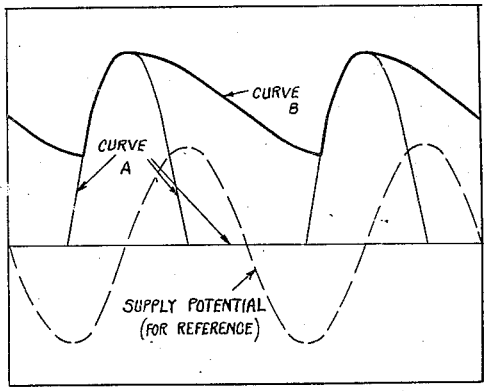

Figure 25 is a diagram showing the potential which would occur from the mechanism shown in Figure 22 alone and in combination with the capacity shown in Figure 24.

Figure 26:
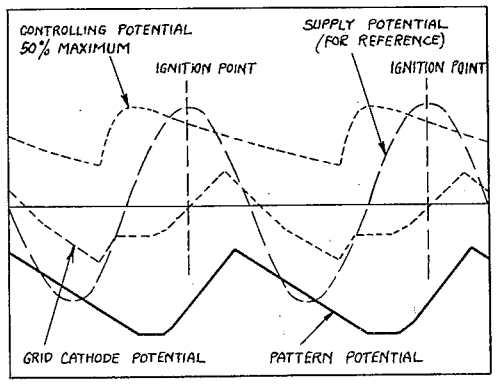

Figure 26 is a diagram of the pattern of potential necessary to be supplied for the mechanism of Figure 24 and of actual potential in this mechanism.

Figure 1:
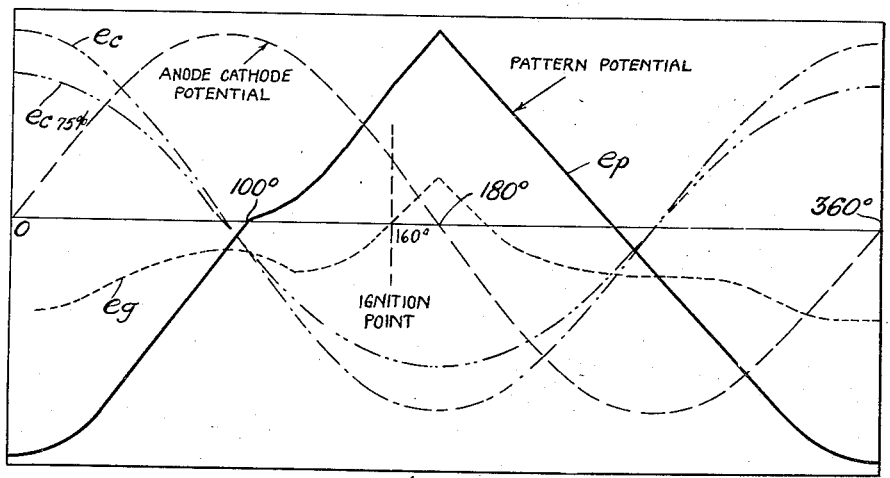
Figure 2:
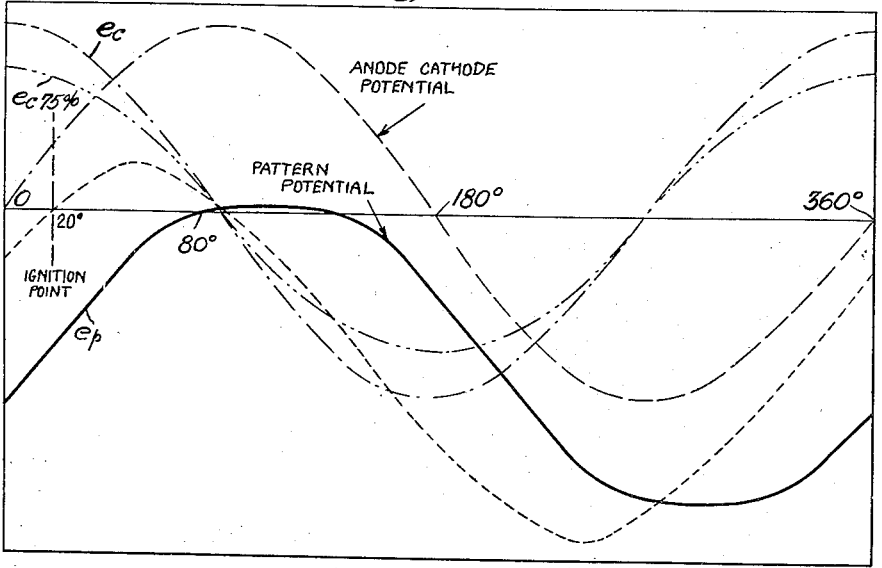

Figures 1 and 2 illustrate in simple form the effect of a grid pattern on the performance of the tube. In both these figures there is a constant sine wave anode cathode potential shown in dash line for reference purposes. The controlling potential $e_c$ is assumed to be a sine wave potential varying from zero to a given maximum and in phase 90° leading the anode-cathode potential. It is apparent that if this controlling potential is applied by itself or with a direct current bias between grid and cathode of the tube, its effect will cause the tube to ignite at the beginning of the anode cathode potential cycle or not to ignite at all.

Figures 3, 4:
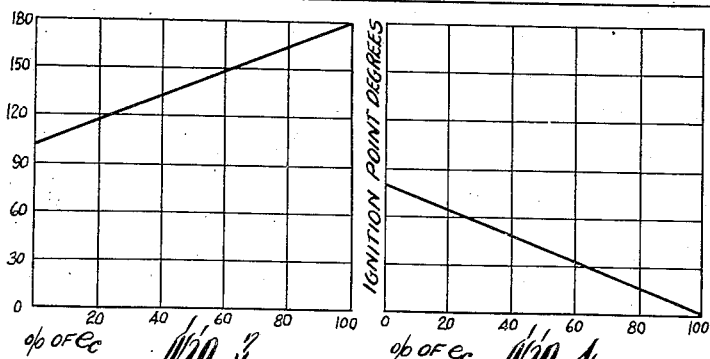
Figures 3 and 4 are diagrams showing the relation of the tube opening time to percentage of full control potential for the two different patterns of potential added, as shown in Figures 1 and 2, respectively.

In Figure 1 there has been added to this controlling potential $e_c$ a pattern potential $e_p$ so arranged that the sum of this pattern potential $e_p$ and the sine wave control potential $e_c$ as shown at $e_g$ will cause ignition of the tube at a time varying with the magnitude of the controlling sine wave potential $e_c$. If this controlling potential is zero, the tube will ignite at a point corresponding to 100° of the anode-cathode potential. As this control potential increases, the ignition occurs later in the anode-cathode potential cycle, finally reaching 180° in the cycle, or zero time of current flow, when the controlling potential $e_c$ reaches its maximum. The resultant characteristic is shown in Figure 3, the pattern curve $e_p$ having been so chosen and the relationship between the magnitude of the controlling potential $e_c$ and the ignition timer is linear. The ordinates of the diagram of Figure 3 represent relative magnitude of flow controlling potential referred to maximum potential as 100% and the abscissas represent degrees of anode-cathode potential cycle at which ignition occurs.

For illustration there is also shown in Figure 1 a value of controlling potential 75% of the maximum with a corresponding actual grid cathode potential ($e_g$ with $k=.75$) resulting from the addition of this controlling potential to the pattern potential $e_p$ indicating an ignition time of 160° in the cycle corresponding to Figure 3. The value of $e_g$ following ignition time is the grid to cathode potential which would occur if no current flow through the grid of the tube occurred. Of course in actual operation, the grid potential never exceeds 15 v. positive and does not reach this value at the time of anode-cathode flow. With a grid circuit of low impedance, the effect of this grid current flow entirely disappears from the grid potential pattern well before ignition time in the next cycle is reached.

In Figure 2 the anode-cathode potential and the controlling potential are the same as in Figure 1, but with an entirely different added pattern potential $e_p$ such that when the controlling potential is zero, the tube opens at a point corresponding to 80° in the anode-cathode potential cycle, and as the controlling potential increases, the time of ignition becomes earlier, until with maximum controlling potential the tube opens at zero degrees of the anode-cathode potential cycle, or, in other words, the tube is opened wide. Here again, is shown a controlling potential 75% of the maximum added to the pattern potential and producing ignition at 20° of anode cathode cycle corresponding to the showing of Figure 4. The value of $e_g$ following ignition time is the grid to cathode potential which would occur if no current flow through the grid of the tube occurred. Of course in actual operation, the grid potential never exceeds 15 v. positive and does not reach this value at the time of anode-cathode flow. With a grid circuit of low impedance, the effect of this grid current flow entirely disappears from the grid potential pattern well before ignition time in the next cycle is reached. Figures 1, 2, 3 and 4 illustrate in general the effect of the addition of a fixed pattern to a cyclic control potential. It is apparent that by varying the predetermined pattern curve, it would be possible to vary the ignition time to produce any desired relationship between controlling potential and average current per cycle, output power per cycle or other resulting characteristic.

Figure 5:
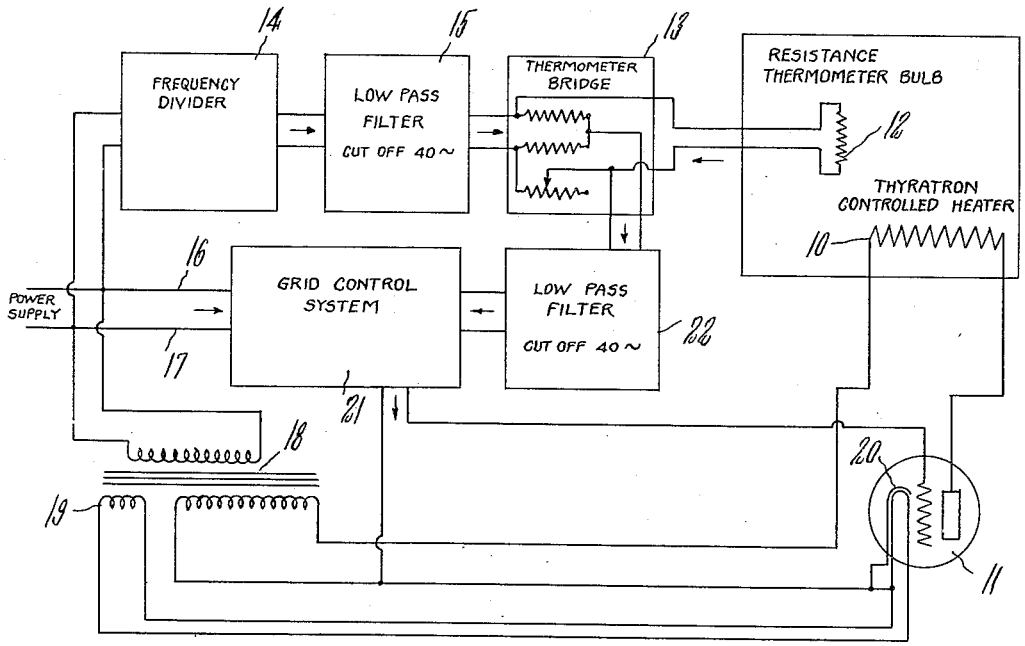
Figure 5 is an outline diagram of a heater control illustrating an application of this invention.

Figure 5 shows in outline a heater control in which a grid control pattern is employed to obtain the desired operating performance. In this system an electric heater 10 is controlled by the thermionic valve or tube 11. This heater may supply the total heat to the furnace, or it may act merely as a supplementary heat supply with a main constant heater (not shown) employed. In either case it is desired that the heat energy supplied by the heater 10 shall be directly proportional to the variation of temperature of the oven from a predetermined standard. It is well known that this direct proportion relationship is important for optimum temperature control. An alternating current thermometer is used to measure the temperature of the oven or furnace. It is shown as provided with the resistance thermometer bulb at 12 and with the thermometer bridge shown at 13, these being of usual construction. There is a special power supply and filter system for this thermometer, including the frequency divider 14, and the low pass filter 15, deriving their power from the alternating current supply leads 16 and 17 from which also the tube 11 receives its cyclic plate-cathode potential as through the transformer 18, a separate tap 19 of this transformer being shown as supplying the heating current for the cathode 20. A grid control system, indicated generally at 21, receives the output of the resistance thermometer, this being shown as through a low pass filter 22, and combines it in suitable form with a predetermined grid pattern to produce a grid cathode potential so that the power per cycle passing from the power supply through the tube 11 to the heater 10 is directly proportional to the unbalanced potential from the thermometer.

The ordinary alternating current resistance thermometer when operated at the power circuit frequency requires great care in shielding. Inductive and capacitance pick up are frequently appreciable compared to the small differential potentials arising from variations of temperature. In order to overcome this, the thermometer is arranged to operate at one-half the supply frequency, this being accomplished by the frequency divider 14 which may be a synchronous motor generator set, a vacuum tube oscillator, or other means for this purpose. The low pass filter 15 removes all harmonic frequencies from the supply. It will be apparent that by using this half frequency the average effect of alternating current pick-up will be zero during any half cycle of the thermometer circuit, for one-half cycle of the thermometer circuits measures a full cycle of the main power circuit, and since the power supply circuit is alternating any pick-up will react equally positive and negative on the thermometer circuit so that the average effect will be zero. The second low pass filter 22 shown between the thermometer circuit and the grid control circuit, is for the purpose of removing any distortion of wave form which might be due to pick-up from the supply system. The control circuit thus receives a net voltage from the thermometer exactly proportional to the unbalance in the thermometer bridge system 13 without any extraneous potentials picked up from the supply circuit.

Figure 6:
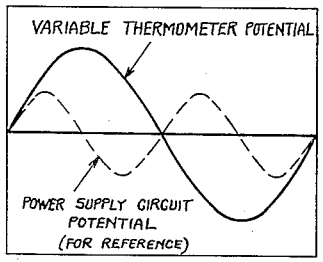
Figures 6 and 8 are diagrams illustrating the action of a portion of the system of Figure 5.

Figure 6 shows diagrammatically the variable potential received from the resistance thermometer, which is a pure sine wave of one-half the frequency of the power supply circuit and varies in magnitude in accordance with the unbalance of the thermometer bridge but remains constant in phase, frequency, and wave form. The magnitude depends on the amount which the temperature of the oven or furnace differs from the specified value. The power supply potential, which is the same as the anode-cathode potential of the tube 11, is plotted in this Figure 6 for reference.

Figure 7:
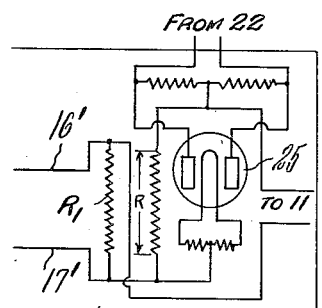
Figure 7 is a diagram of the grid control system shown in outline in Figure 5.

Figure 7 shows the circuit of the grid control system 21. In this the half frequency potential from the thermometer through the low pass filter 22 is rectified through a full wave rectifier 25, producing a potential across a resistance R. To this potential through the leads 16', 17', is added a pattern potential whose pattern is chosen so that the power per cycle in the heating resistor 10 supplied from the tube 11 shall be proportional to the magnitude of the half frequency controlling potential from the thermometer.

Figure 8:
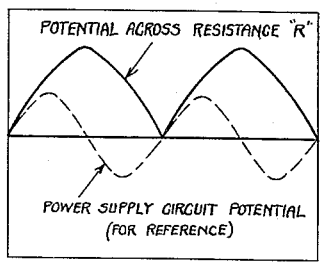

Figure 8 shows the potential across the resistance R of the grid control circuit derived from the potential of the resistance thermometer. This potential is constant in phase, frequency, and wave form, but varies in magnitude exactly with the potential from the thermometer and hence with the temperature itself. It will be noted that this potential has the same frequency as the supply frequency which has been shown in dotted line by way of comparison, but has a quite complex wave form due to the rectifier action. This wave form could, of course, be resolved into fundamental and harmonics, all of which vary together in exact proportion to the temperature.

Figure 9:
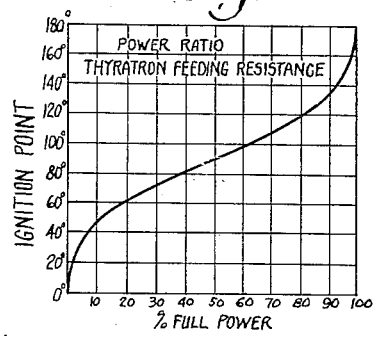
Figure 9 is a diagram showing the tube ignition point plotted against percentage of full power.

Figure 9 shows the point at which tube ignition must occur for various percentages of full power input to the heater; this percentage of full power must vary exactly with the potential derived from the resistance thermometer.

Figure 10:
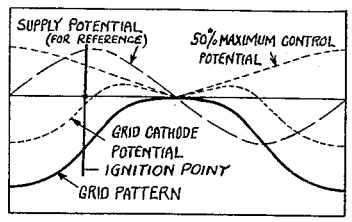
Figure 10 is a diagram showing the grid voltage control pattern.

Figure 10 shows the necessary grid pattern which must be applied in addition to the potential derived from the resistance thermometer in order that the power in the heating circuit of the oven or furnace shall be proportional to the difference between the actual temperature and a specified value. The grid pattern potential curve is determined from the value of potential across R as shown in Figure 8, and the power ratio as shown in Figure 9. For control of the type described, the percentage of full power in the heater must be the same as the percentage of maximum potential across the resistance R. Thus for 50% maximum potential across R, the power in the heater must be 50% of full value which corresponds to 90° ignition point on Figure 9. If the tube is to ignite at 90°, there must be added to the 50% maximum potential across R at the 90° point, a potential opposite and nearly equal, so that the sum of the two shall equal the critical ignition potential of the tube. This value of added potential required determines a value of "grid pattern" potential for 90°. Similarly for 40% maximum potential across resistance R power in the heater must be 40% corresponding to 80° on Figure 9. A value of pattern potential for 80° may be derived in the manner just described. The complete grid pattern shown in Figure 10 is the complete curve derived in this manner for values from zero degrees to 180°. For values from 180° to 360°, the values of grid pattern are relatively unimportant, and for convenience have been shown symmetrical to the values from zero degrees to 180°. Potential of this prescribed pattern is derived from the power supply and applied through leads 16' and 17' to the resistance $R_1$ as shown in Figure 7. Means for producing cyclic voltage having any desired wave form are well known in the art and it is not deemed necessary to illustrate any specifically herein, it being only necessary to derive from such a source a voltage of the required pattern. By this means the supply of electric power to the heater is controlled by the temperature variations through variation of a cyclic control voltage to which is added a specific cyclic pattern voltage, taking into account the peculiarities and characteristics of the various mechanisms employed in the entire system. This particular example illustrates the manner in which a desired relationship between controlling potential and controlled power is established by the use of a grid pattern applied to the grid cathode system of the tube. The pattern of potential applied between grid and cathode consists of the variable potential from the thermometer plus a fixed component, the fixed component being predetermined in such a manner that the effect of the variation from the potential of the thermometer is quite different from the effect which would occur if the controlling potential were applied directly from grid to cathode and results in exactly the desired relationship between the variable thermometer potential and the resultant heating effect in the furnace. It will be noted in this example of an application of this invention, that the control of the passage of electric power is effected by means of a controlling device, which, in this particular case, is responsive to the condition which is effected by the electric power passed.

In some cases, it may be desired to control the passage of power according to a pattern extending over two or more cycles of anode-cathode potential, said pattern occurring regularly; the pattern in this case may be fixed, or may contain in addition to its fixed aspects, variable controlling potentials. An example of this is illustrated in Figures 11 to 19, inclusive. The specific example chosen is for operating the shake of a paper machine in accordance with a desired acceleration cycle.

Figure 11:
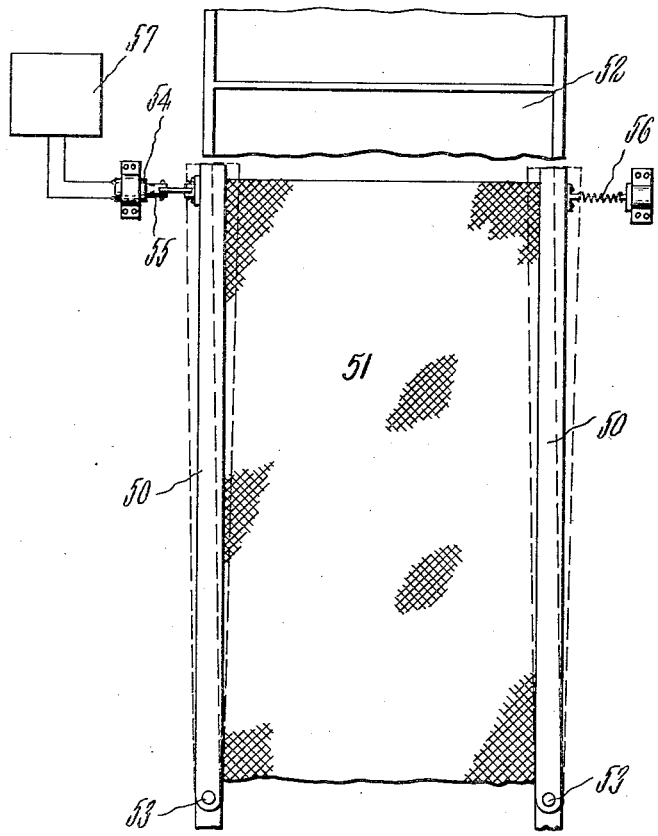
Figure 11 is a fragmentary diagrammatic plan view of the wet end of a paper machine showing an electrically actuated shake.
Figure 12:
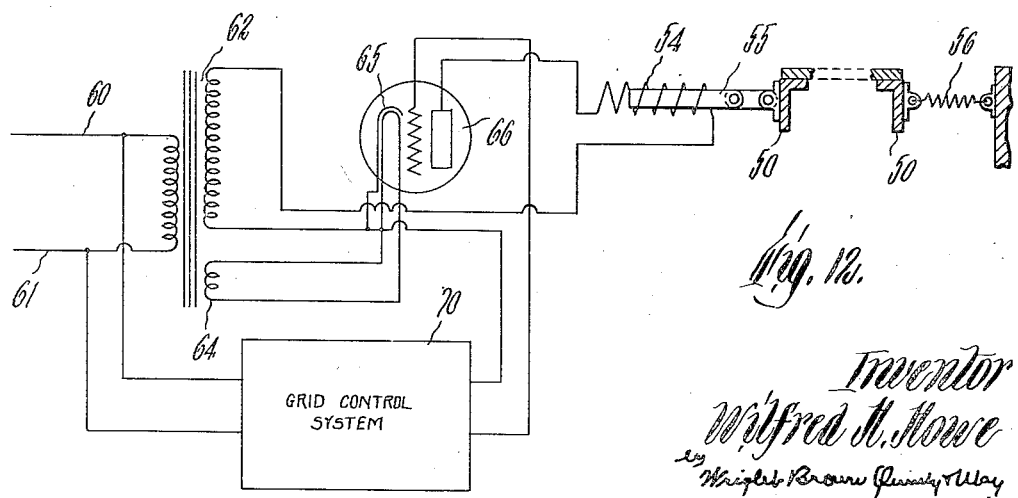
Figure 12 is a diagram of an electric power control for the shake and illustrating another application of this invention.

Referring to Figures 11 and 12, at 50 are shown the side rails of a paper machine which carry suitable supporting means for the Fourdrinier wire 51 at the wet end of the paper machine and onto which wire the paper stock is flowed from the head box 52. In order to improve the interfelting qualities of the paper so that the fibers may lie crosswise as well as longitudinally of the wire, it has been customary to apply a transverse shaking motion to the side rails near the head box, it being a common arrangement to pivot these side rails forwardly as at the points 53.

For the purpose of imparting this shake a solenoid has been shown at 54, the core 55 of which is connected to one of the rails 50. To the opposite side rail is connected a spring 56 which opposes drawing of core 55 into the solenoid 54 by the passage of electrical energy. This energy is received from an instrument box shown at 57 containing the mechanism for supplying power to the solenoid in the desired cyclic fashion to produce the shake.

Figure 16:
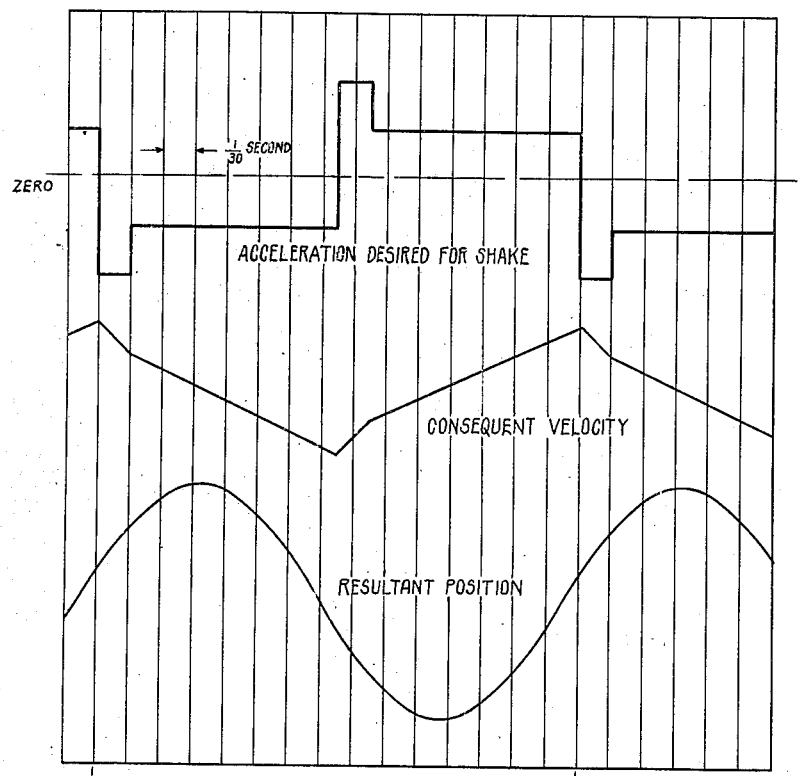
Figure 16 is a diagram showing the relation to an arbitrary shake acceleration pattern of velocity and position of the shake in its path of motion.

In Figure 16 is shown at the top an acceleration diagram for the shake which has been chosen arbitrarily, the idea being to accelerate and decelerate the shake mechanism in such a way as to provide the greatest possible uniformity of interfelting of the paper fibers. Below the acceleration pattern is shown the corresponding velocity of motion of the shake and below that the curve shows the resultant position of the shake mechanism in its path of oscillation at any time.

Figure 17:
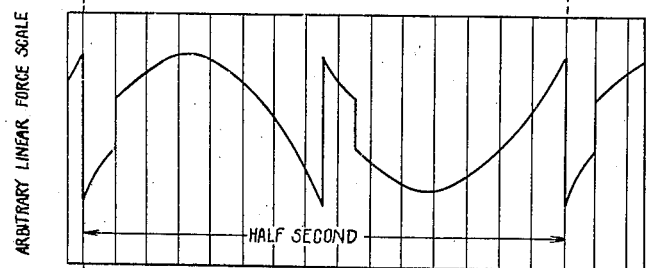
Figure 17 shows the pattern of solenoid pull required to produce the desired acceleration shake pattern of Figure 16.

Figure 17 shows the pull of the solenoid necessary to produce the desired acceleration pattern of Figure 16. It will be noted that the whole shake cycle takes place every half second and this cycle is to be produced by power passed through the ionic valve from an alternating power circuit which has been assumed as of 60-cycle frequency.

For simplicity it has been assumed that the solenoid has a constant resistance and reactance, the inductive reactance $X_L$ being assumed five times the resistance R. It has also been arbitrarily assumed that the pull of the solenoid is proportional to the current flow throughout its working range. These assumptions are of course arbitrary but simplify the explanation. It is apparent that these assumptions have no effect on the principles involved and that it would be possible to provide a grid pattern corresponding to any characteristics of any solenoid which might be employed.

Figure 18:
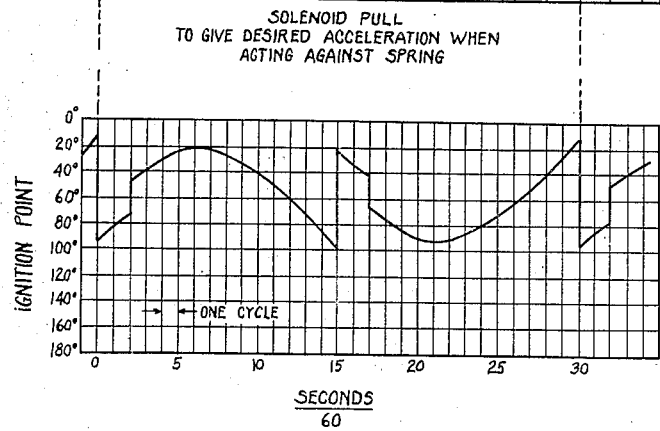
Figure 18 is a diagram showing the pattern of ignition of the thermionic valve required to produce such an acceleration shake pattern.

Figure 18 shows the variation in ignition point of a thermionic valve or tube in order to produce the desired shake pattern.

The general circuit for the tube is shown in Figure 12, the 60-cycle power lines being shown at 60 and 61 from which power is taken through the transformer 62 for the anode-cathode circuit, which includes the solenoid 54. From a separate winding 64 of the transformer 62 is derived heating current for the cathode 65. The grid cathode circuit for the thermionic valve 66 which acts as a rectifier is provided with the grid control system shown in Figure 12 in outline at 70.

Figure 13:
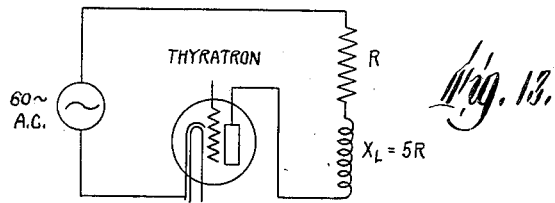
Figure 13 is the equivalent circuit of Figure 12.

The equivalent anode-cathode circuit is shown in Figure 13 supplying power through a resistance R, and a reactance $X_L$ as above mentioned.

Figure 14:
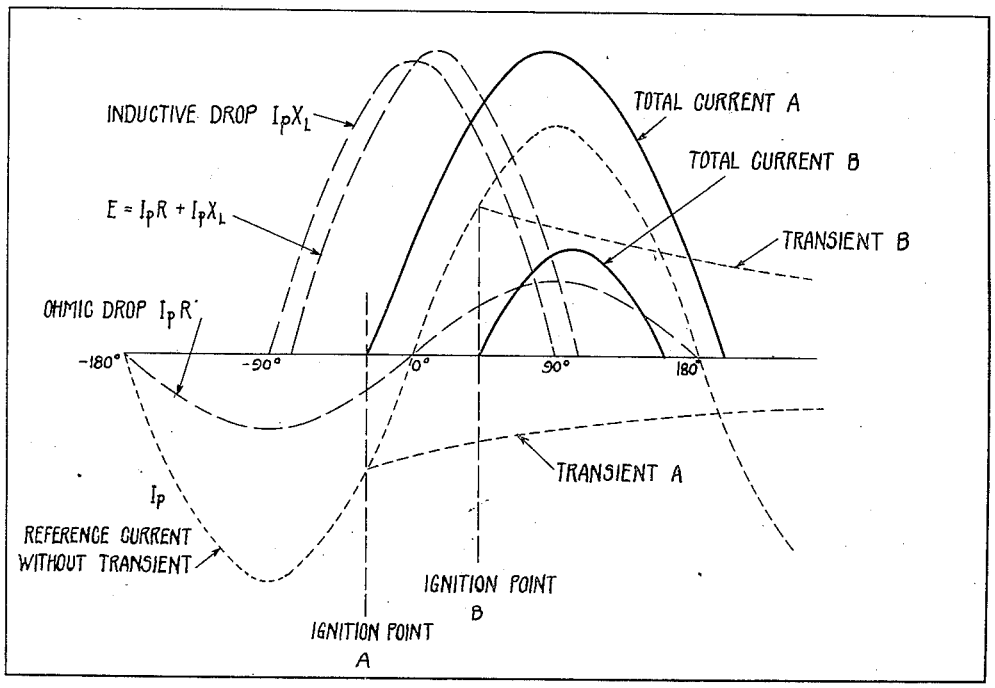
Figure 14 is a diagrammatic view illustrating various factors making up a grid controlling voltage pattern.

Figure 14 shows the effects of these impedances on the actual current flow with two typical points A and B. The supply potential curve E is shown in dash lines. Against this are plotted the actual total current flow for ignition times A and B. The current flow when potential is applied to a circuit having an inductive reactance such as $X_L$ consists of a sine wave component plus a transient component, the sine wave being the current which would flow if the current were flowing continuously, and the transient being set up by turning on the current into a reactive load. At the ignition point the current will, of course, start from zero regardless of its position in the impressed voltage cycle, and with inductive load it will be delayed in reaching a value corresponding to continuous flow by this transient. The sum of the sine wave component and the transient gives the value shown for each of the total current curves.

Figure 15:
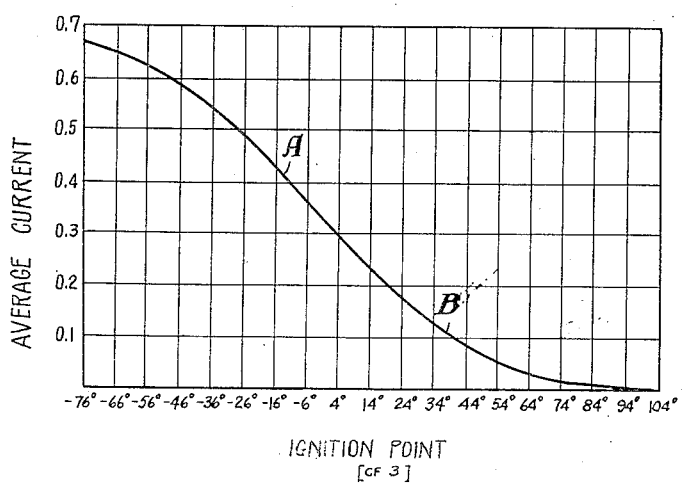
Figure 15 is a diagram showing the relation of the ignition point to average current flow.

The area under the total current curve represents the average current per cycle. Figure 15 is a plot of the value of this area against the ignition time. It is apparent that in order to obtain the desired motion of the shake it is necessary that the ignition point in each of the thirty cycles be that shown in Figure 18.

Figure 19:
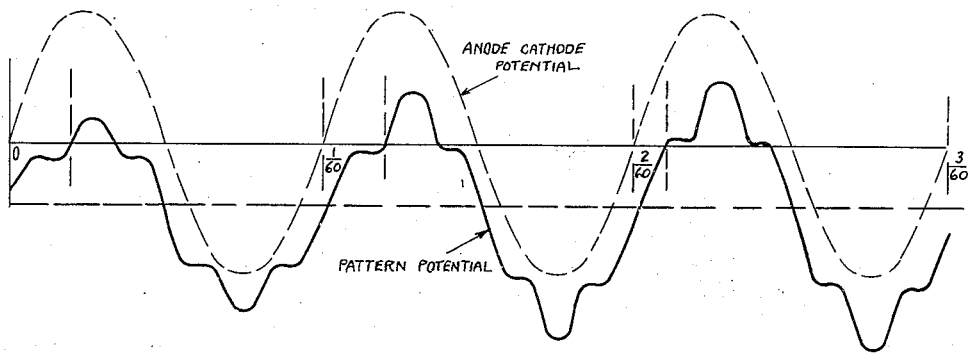
Figure 19 is a diagram showing portions of the grid potential pattern and the resulting ignition time in three sections of the operative cycle.
Figure 19:
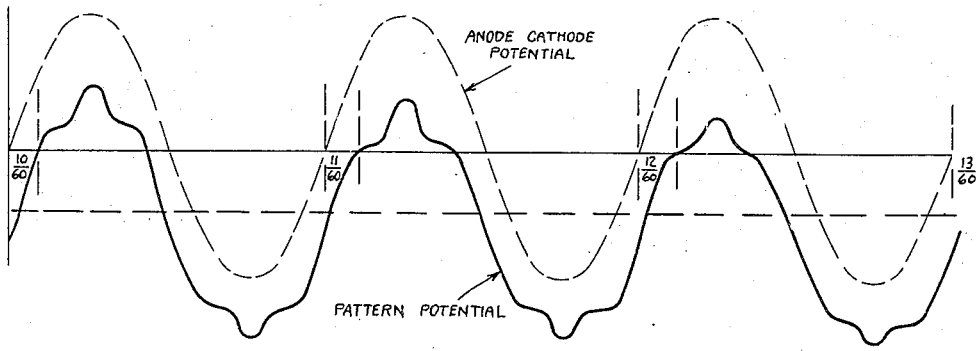
Figure 19:
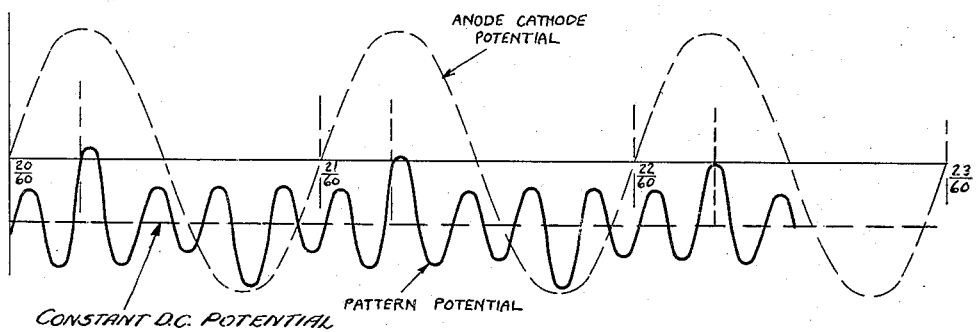

Figure 19 shows three sections of pattern potential for control of the ionic valve, required to produce the ignition times indicated in Figure 18. The figure shows the three cycles of anode-cathode potential in each section, the sections commencing with the first, eleventh and twenty-first cycles of the complete 30-cycle pattern. The anode-cathode potential is shown for reference, and against this is plotted the pattern potential consisting of a constant direct current potential plus components of 58, 60 and 62-cycle sinusoidal alternating current potential, plus their respective harmonics. Mixing 58, 60 and 62 cycle potentials gives a beat frequency of two cycles per second and thus gives a cyclic control potential pattern repeating itself every half second as desired. It may be shown that by the proper choice of harmonic phase and magnitude relationships exact correspondence to the curve of Figure 18 or any other desired characteristic may be obtained. The values of pattern potential shown as positive following ignition time in each cycle are the potentials which would occur if there were no current flow through the grid of the tube. Of course, in actual operation, the grid potential never exceeds fifteen volts positive and does not reach this value during the time of anode-cathode current flow. With a grid circuit of low impedance, the effect of this grid current flow entirely disappears from the grid potential pattern well before ignition time in the next cycle is reached.

Figures 20 to 26 show still another example of a control in accordance with this invention. Figure 20 shows the system which is similar in general to one shown in my co-pending application Serial Number 682,120, hereinbefore mentioned. In this system a high frequency moisture measuring device 100 measures the moisture content of paper on a paper machine as shown, for example, in the Allen Patent No. 1,781,153 of November 11, 1930, and through a suitable control system turns steam on and off the paper machine driers as through the steam valve 101 to correct for changes in the moisture content as measured. In my co-pending application Serial No. 682,120, the high frequency from the moisture measuring mechanism is rectified and filtered and the resulting direct current potential is used to control an ionic tube, which, in turn, controls the steam flow by means of a solenoid-operated steam valve. More rapid and accurate operation is possible, if, instead of rectifying and filtering the high frequency output of the moisture measuring mechanism giving as a result pure direct current potential, this output has simply the high frequency component removed so as to provide an output of pulsating direct current. Such a pulsating direct current is shown as used herein. In the lower portion of this figure are shown characteristic diagrams of the actions within the outlying units in the upper portion of the figure. It is herein assumed that it is desired that the steam flow be proportional to the variation of moisture with narrow limits and outside of these limits be shut off entirely or turned wholly on, depending on whether the moisture content is lower or higher, respectively, than these limits. This particular controlled relation is not claimed herein, but forms subject matter of another co-pending application.

Figure 23 shows the envelope of the high frequency potential from the measuring mechanism operated directly from an alternating current supply. Its output is a high frequency current which flows during one-half cycle and whose value during this cycle has an envelope one-half of a sine wave, as shown in full lines in this figure. The magnitude of the individual high frequency alterations and of the corresponding envelope varies in accordance with variations in moisture content of the material of which the moisture content is being measured but remains constant in wave form and frequency. As in previous figures, the supply potential has been shown in dash lines in this figure for reference.

Figure 22 shows a partial rectifier system for converting this high frequency to a cyclic potential with negligible high frequency component. This employs the diode rectifier 105 arranged in "parallel feed." The condensers 106 and 107 are of values so small that their impedance to current flow of the frequency of the output current is very high indeed. The impedance of the radio frequency choke 108 to this cyclic potential is negligible. The resultant cyclic output potential of this system, either without load or feeding into a resistance load is shown in the curve A of Figure 25. This curve is the same as the positive half of the envelope of high frequency potential shown in Figure 23. It will be noted that the cyclic output potential is shown as fed into a resistance $R_{32}$.

In Figure 24 is shown in outline the grid control circuit for the ionic valve 110, shown in Figure 20, to control the passage of electric power therethrough for actuating the valve 101. This grid control circuit draws a cyclic component from the partial rectifying system shown in Figure 22. A .3 mfd. condenser is connected in parallel with the resistance $R_{32}$ of Figure 22 and due to the fact that the supply to the resistance $R_{32}$ is through a rectifier the potential across this condenser 115 will continue after the supply potential has decreased. This produces a transient phenomenon and results in a potential curve across the resistance $R_{32}$ as shown in curve B of Figure 23. This curve, like the curve A, is constant in phase and wave form but varies in magnitude. To this is added a pattern potential supply indicated as supplied across the resistance $R_{34}$ shown in Figure 24. The sum of these two potentials is impressed between the grid and cathode of the ionic valve 110.

The arrangement shown in Figures 22 and 24 combine to form the grid controlling mechanism 120 of Figure 20. The center diagram of Figure 20 shows the desired ionic, or in this case, thermionic, ignition time, plotted against controlling voltage and corresponds to the rectifier ignition point diagram in Figure 20 of my co-pending application Serial No. 682,120. The vertical scale for this diagram represents the proportional magnitude of the curve B of Figure 25 herein and the horizontal scale shows the desired resulting ignition time of the thermionic tube to variation of its controlling potential.

Figure 26 shows the necessary pattern potential which must be added in order to secure the control indicated in the center diagram of Figure 20. In this Figure 26 has been shown the necessary pattern potential, and, as in previous figures, the supply potential to the tube 110. There has also been plotted a value of control potential of 50% maximum value and the actual grid to cathode potential which would result, this being the sum of the pattern potential and the 50% maximum supply potential. It will be noted that this cuts the axis at 90° on the supply potential circuit, corresponding to the desired condition as shown in the center diagram of Figure 20, so that the resultant control gives a valve opening versus moisture generally similar to the showing in my co-pending application Serial No. 682,120. By modifying the pattern potential any desired ratio between controlling moisture and controlled valve opening can be maintained.

The grid cathode potential shown positive following ignition time is the potential which would occur if there were no current flow through the grid of the ionic rectifier. Of course, in actual operation the grid potential never exceeds 15 v. positive and does not reach this value at the time of anode cathode flow. With a grid control circuit as shown, the effect of this grid current flow entirely disappears from the grid potential pattern well before ignition time in the next cycle is reached.

For purposes of definition, all complex wave forms are assumed resolved into their separate sinusoidal components, and each such sinusoidal component is regarded as a separate component of the control system. Thus the controlling voltage pattern contains at least two cyclic components, at least one of which differs in frequency from that of the voltage differential between the anode and cathode. Within these limits the invention covers patterns with no variable components, and with one or more variable cyclic components, any of which may be responsive in a relationship to any variable affecting the performance of the system. It also covers pattern control with one cyclic variable and in addition a variable direct current controlling potential.

Methods of producing cyclic voltages of any desired frequencies, phase relations and magnitudes are well known in the art and per se form no part of the present invention (see for example "Electrical Engineering" for September, 1935, vol. 54, page 950, an article by E. B. Kurtz and M. J. Larsen).

From the foregoing description of the general subject matter of this invention and certain specific illustrative examples, it should be evident to those skilled in the art that various other applications of the invention and modifications can be made without departing from the spirit or scope of this invention as defined by the appended claims.

The term "continuous variation of power during contiguous cycles" as used in certain of the claims refers to a variable power passage during certain contiguous cycles wherein the power passed during such cycles is in amount intermediate to the maximum and minimum corresponding, respectively, to full open and full closing of the valve for the entire duration of the positive half of the cycle.

The term "non-harmonically related frequencies" as used herein means frequencies which may bear any relationship integral or not, except where one is an integral multiple of the other.

I claim:

1. The method of continuously controlling a condition influenced by the electrical power passed by an ionic valve having a plurality of electrodes and means for controlling the time of start of current flow through the valve, which comprises impressing a cyclic voltage differential between said electrodes periodically reaching a value to stop the power flow once started, and impressing on said control means a controlling voltage of predetermined pattern containing at least one fixed cyclic component and a continuous component of frequency less than that of said voltage differential.

2. The method of continuously controlling a condition influenced by the electrical power passed by an ionic valve having a plurality of electrodes and means for controlling the time of start of current flow through the valve, which comprises impressing a cyclic voltage differential between said electrodes periodically reaching a value to stop the power flow once started, and impressing on said control means a controlling voltage of predetermined pattern containing at least one fixed cyclic component and a continuous component of frequency greater than that of said voltage differential and non-harmonically related thereto.

3. In the method of continuously controlling a condition influenced by the electric power passed by an ionic valve having a plurality of electrodes and means for controlling the time of start of current flow through said valve, which comprises impressing a cyclic voltage differential between said electrodes periodically reaching a value to stop the power flow once started, that step which comprises organizing the component parts of a controlling circuit for said control means to produce a controlling voltage of predetermined continuous pattern containing at least one fixed cyclic component and a component of frequency less than that of said voltage differential necessary to produce a desired continuous relationship between the value of the condition and the power passed by the valve.

4. In the method of continuously controlling a condition influenced by the electrical power passed by an ionic valve having a plurality of electrodes and means for controlling the time of start of current flow through said valve, which comprises impressing a cyclic voltage differential between said electrodes periodically reaching a value to stop the power flow once started, that step which comprises organizing the component parts of a controlling circuit for said control means to produce a continuously defined controlling voltage containing at least one fixed cyclic component and a component of frequency greater than and non-harmonically related to that of said voltage differential necessary to produce a desired continuous relationship between the value of the condition and the power passed by the valve.

5. A method of continuously controlling a condition influenced by the electrical power passed by an ionic valve having a plurality of electrodes and means for controlling the time of start of current flow through the valve, which comprises impressing a cyclic voltage differential between said electrodes periodically reaching a value to stop the power flow once started, and impressing on said control means a controlling voltage of predetermined pattern containing at least one fixed cyclic component and a continuous component of frequency less than that of said voltage differential, said components being chosen to cause continuous variation in power during contiguous cycles of said voltage differential.

6. The method of continuously controlling a condition influenced by the electrical power passed by an ionic valve having a plurality of electrodes and means for controlling the time of start of current flow through the valve, which comprises impressing a cyclic voltage differential between said electrodes periodically reaching a value to stop the power flow once started, and impressing on said control means a controlling voltage of predetermined pattern containing at least one fixed cyclic component and a continuous component of frequency greater than that of said voltage differential and non-harmonically related thereto, said components being chosen to cause continuous variation in power during contiguous cycles of said voltage differential.

7. In the method of controlling a condition which it is desired to vary in accordance with a definite program, said condition being influenced by the electrical power passed by an ionic valve having a plurality of electrodes and means for controlling the time of start of current flow through said valve, which comprises impressing a cyclic voltage differential between said electrodes periodically reaching a value to stop the power flow once started, the steps which comprise determining the desired continuous pattern of variation of the condition and the variation of power necessary to be passed by said valve to produce such continuous pattern of variation of condition, determining the continuous pattern containing at least one fixed cyclic component and a variable cyclic component differing in frequency from said fixed component necessary to produce said desired continuous variation of power passed by said valve when impressed on said control means, and organizing the component parts of the control circuit to produce said continuous pattern.

8. In the method of controlling a condition which it is desired to vary in accordance with a definite program, said condition being influenced by the electrical power passed by an ionic valve having a plurality of electrodes and means for controlling the time of start of current flow through said valve, which comprises impressing a cyclic voltage differential between said electrodes periodically reaching a value to stop the power flow once started, the steps which comprise determining the desired continuous pattern of variation of the condition and the variation of power necessary to be passed by said valve to produce such continuous pattern of variation of condition, determining the continuous pattern containing at least one fixed cyclic component and a variable cyclic component differing in frequency from said fixed component necessary to produce said desired continuous variation of power passed by said valve when impressed on said control means, and organizing the component parts of the control circuit to produce said continuous pattern.

9. In the method of controlling a condition which it is desired to vary in accordance with a definite program, said condition being influenced by the electrical power passed by an ionic valve having a plurality of electrodes and means for controlling the time of start of current flow through said valve, which comprises impressing a cyclic voltage differential between said electrodes periodically reaching a value to stop the power flow once started, the steps which comprise determining the desired continuous pattern of variation of the condition and the variation of power necessary to be passed by said valve to produce such continuous pattern of variation of condition, determining the continuous pattern containing at least one fixed cyclic component and a variable cyclic component differing in frequency from said fixed component necessary to produce said desired continuous variation of power passed by said valve during contiguous cycles when impressed on said control means, and organizing the component parts of the control circuit to produce said continuous pattern.

10. In a system including an electrical apparatus to be controlled, a source of power, an ionic valve having separate control of ignition time for controlling the passage of electrical energy from said source to said apparatus, and a control circuit for said ignition time receiving power from said supply and effected by a condition of said apparatus, said control circuit comprising means affording a continuous cyclic component of control essentially free from any component of the same fundamental frequency as said source.

11. In a system including an electrical apparatus to be controlled, a source of power, an ionic valve having separate control of ignition time for controlling the passage of electrical energy from said source to said apparatus, and a control circuit for said ignition time receiving power from said supply and effected by a condition of said apparatus, said control circuit comprising means affording a cyclic component of control the fundamental frequency of which is less than the frequency of said source.

12. In a system including an electrical apparatus to be controlled, a source of power, an ionic valve having separate control of ignition time for controlling the passage of electrical energy from said source to said apparatus, and a control circuit for said ignition time receiving power from said supply and effected by a condition of said apparatus, said control circuit comprising means affording a variable cyclic component of control the fundamental frequency of which is greater than the frequency of said source.

13. In a system including an electrical apparatus to be controlled, a source of power, an ionic valve having separate control of ignition time for controlling the passage of electrical energy from said source to said apparatus, and a control circuit for said ignition time receiving power from said supply and effected by a condition of said apparatus, said control circuit comprising means affording a cyclic component of control the fundamental frequency of which is different from and non-harmonically related to the frequency of said source.

14. In a system including an electrical apparatus having a condition to be controlled, a source of power, an ionic valve having separate control of ignition time for controlling the passage of electrical energy from said source to said apparatus, and a controlling circuit for said ignition time impressing on said control a variable controlling alternating current potential, said potential containing at least one component of the fundamental frequency of said source, means producing an alternating current voltage having a component of a frequency different from that of said source, and means impressing said alternating current voltage on said control circuit, said producing means being designed to produce a continuously defined wave front, which when impressed on the wave front of said controlling circuit unmodified by said means produces a specific continuous controlling wave front effective to produce a desired specific continuous relationship between the controlled condition and the power passed by said valve as said controlling potential is varied.

15. In a system including an electrical apparatus having a condition to be controlled, a source of power, an ionic valve having separate control of ignition time for controlling the passage of electrical energy from said source to said apparatus, and a controlling circuit for said ignition time impressing on said control a variable controlling alternating current potential, a component of which is derived from said condition, said potential containing at least one component of the fundamental frequency of said source, means producing an alternating current voltage having a component of a fundamental frequency different from that of said source, and means impressing said alternating current voltage on said control circuit, said producing means being designed to produce a continuously defined wave front, which when impressed on the wave front of said controlling circuit unmodified by said means produces a specific continuous controlling wave front effective to produce a desired specific continuous relationship between the controlled condition and the power passed by said valve.

16. In a system including an electrical apparatus having a condition to be controlled, a source of power, an ionic valve having separate control of ignition time for controlling the passage of electrical energy from said source to said apparatus, and a controlling circuit for said ignition time impressing on said control a variable controlling alternating current potential, said potential containing at least one component of the fundamental frequency of said source, means producing an alternating current voltage having a component of a fundamental frequency less than that of said source, and means impressing said alternating current voltage on said control circuit, said producing means being designed to produce a continuously defined wave front, which when impressed on the wave front of said controlling circuit unmodified by said means produces a specific continuous controlling wave front effective to produce a desired specific continuous relationship between the controlled condition and the power passed by said valve as said controlling potential is varied.

17. In a system including an electrical apparatus having a condition to be controlled, a source of power, an ionic valve having separate control of ignition time for controlling the passage of electrical energy from said source to said apparatus, and a controlling circuit for said ignition time impressing on said control a variable controlling alternating current potential, said potential containing at least one component of the fundamental frequency of said source, means producing an alternating current voltage having a component of a fundamental frequency greater than and non-harmonically related to that of said source, and means impressing said alternating current voltage on said control circuit, said producing means being designed to produce a continuously defined wave front, which when impressed on the wave front of said controlling circuit unmodified by said means produces a specific continuous controlling wave front effective to produce a desired specific continuous relationship between the controlled condition and the power passed by said valve as said controlling potential is varied.

18. The method of continuously controlling a condition influenced by the electrical power passed by an ionic valve having a plurality of electrodes and means for controlling the start of current flow through said valve, which comprises impressing a cyclic voltage differential between said electrodes periodically reaching a value to stop the power flow once started, and impressing on said control means a cyclic voltage of predetermined pattern extending over at least two cycles of said voltage differential chosen in accordance with the particular needs of the condition to be controlled and inherently capable of continuous control of said valve to produce the condition control desired.

19. The method of producing from a cyclic source a cyclic passage of electrical power continually varying over more than one cycle according to a repeated pattern, which comprises impressing a cyclic voltage differential from said source across the electrodes of an ionic valve having a voltage-responsive means controlling the time of start of current flow through said valve, said differential periodically reaching a value to stop the flow of current once started, and impressing on said time control a cyclic voltage of a definite continuous pattern repeating at a frequency less than that of the voltage differential.

20. The method of producing from a cyclic source a cyclic passage of electrical power continuously varying over more than one cycle according to a repeated pattern, which comprises impressing a cyclic voltage differential from said source across the electrodes of an ionic valve having a voltage-responsive means controlling the time of start of current flow through said valve, said differential periodically reaching a value to stop the flow of current once started, and impressing on said time control a cyclic voltage of a definite continuous pattern repeating at a frequency less than that of the voltage differential and a variable cyclic controlling voltage.

21. The method of controlling the passage of electrical power from an alternating source by means causing variation in current flow from an impressed alternating current voltage, said current flow varying in magnitude responsively to variations in controlling conditions, which comprises impressing on said means alternating current voltage one-half the frequency of said electric power, and controlling the passage of said electrical power responsive to the effective values of said current flow in both directions.

22. The method of controlling the passage of electric power from an alternating current source in a manner responsive to a condition effected by the passage of said power, by means of a responsive means energized by cyclic electric power passing through an ionic valve having a plurality of electrodes and a control of time of start of current flow through said valve, which comprises impressing alternating voltage on said electrodes, impressing on said responsive means alternating voltage of one-half the frequency of said electrode voltage, producing alternating current flow variable in response to variations in said condition, and impressing on said control a cyclic voltage having a component derived from both directions of current flow from said responsive means.

23. The method of continuously controlling the passage of electric power through an ionic valve having a plurality of electrodes and a control of start of current flow, which comprises impressing a cyclic voltage differential between said electrodes periodically reaching a value to stop current flow once started, and impressing on said control a continuous cyclic voltage having at least two components at least one of which is of different and non-harmonically related frequency to that of said cyclic differential.

24. The method of continuously controlling the passage of electric power through an ionic valve having a plurality of electrodes and a control of start of current flow, which comprises impressing a cyclic voltage differential between said electrodes periodically reaching a value to stop current flow once started, and impressing on said control a continuous cyclic voltage having at least two components at least one of which is of lower frequency than that of said cyclic differential.

25. The method of producing from a cyclic source a cyclic passage of electrical power continually varying over at least two cycles according to a repeated pattern, which comprises impressing a cyclic voltage differential from said source across the electrodes of an ionic valve having a voltage responsive means controlling the time of start of current flow through said valve, said differential periodically reaching a value to stop the flow of current once started, and impressing on said time control a cyclic voltage having at least two components at least one of which is of a repeating predetermined pattern covering at least two cycles to produce such cyclic passage of electrical power.

26. The method of continuously controlling the passage of electric power through an ionic valve having a plurality of electrodes and a control of start of current flow, which comprises impressing a cyclic voltage differential between said electrodes periodically reaching a value to stop current flow once started, and impressing on said control a continuous cyclic voltage of different and non-harmonically related frequency to that of said cyclic differential and chosen to cause continuous variation in power during contiguous cycles of said voltage differential.

27. The method of continuously controlling the passage of electric power through an ionic valve having a plurality of electrodes and a control of start of current flow, which comprises impressing a cyclic voltage differential between said electrodes periodically reaching a value to stop current flow once started, and impressing on said control a continuous cyclic voltage of lower frequency than that of said cyclic differential and chosen to cause continuous variation in power during contiguous cycles of said voltage differential.

28. The method of producing from a cyclic source a cyclic passage of electrical power continually varying over at least two cycles according to a repeated pattern, which comprises impressing a cyclic voltage differential from said source across the electrodes of an ionic valve having a voltage responsive means controlling the time of start of current flow through said valve, said differential periodically reaching a value to stop the flow of current once started, and impressing on said time control a cyclic voltage of a repeating predetermined pattern covering at least two cycles and chosen to cause continuous variation in power during contiguous cycles of said voltage differential.

29. The method of continuously controlling the passage of electric power through an ionic valve having a plurality of electrodes and a control of start of current flow, which comprises impressing a cyclic voltage differential between said electrodes periodically reaching a value to stop current flow once started, and impressing on said control a continuous cyclic voltage having a fundamental frequency higher than and non-harmonically related to that of said cyclic differential and chosen to cause continuous variations in power during contiguous cycles of said voltage differential.

30. In a system where it is required that the flow of electrical energy passing from a source to an output circuit shall be controlled in a predetermined, continuous relationship to the value of a cyclic electrical control potential, said system comprising an ionic valve having a separate control of ignition time for controlling the passage of electrical energy from said source to said output circuit, and a control circuit for said ignition time on which is impressed a variable cyclic control potential, the method of obtaining said predetermined, continuous relationship which comprises: determining the relationship between flow of energy through said valve to the load and the required ignition time of said valve during each cycle considering the characteristics of the input circuit, output circuit, and said valve; determining the instantaneous value of the variable cyclic controlling potential at the required ignition time considering the required relationship between the cyclic controlling potential and the flow of energy to the load, and the relationship between flow of energy to the load and ignition time of the controlled valve; determining for each value of the ignition time the required additional potential which must be applied to the control circuit so that, when combined with the determined instantaneous value of cyclic control potential for that ignition time the total potential on said valve control will be just sufficient to cause ignition of said valve; arranging a source of additional complex cyclic potential so that for every value of ignition time, the necessary additional determined potential will be supplied to said control circuit; and applying said additional potential as well as the cyclic control potential to the ignition time control circuit.

WILFRED H. HOWE.